(12) United States Patent
Curescu et al.

(10) Patent No.: US 10,103,566 B2
(45) Date of Patent: Oct. 16, 2018

(54) SUITCASE INTEGRATED CHARGING AND POWERING DEVICE

(71) Applicants: Gennes Curescu, Skokie, IL (US); Marius Strizu, Gresham, OR (US)

(72) Inventors: Gennes Curescu, Skokie, IL (US); Marius Strizu, Gresham, OR (US)

( * ) Notice: Subject to any disclaimer, the term of this patent is extended or adjusted under 35 U.S.C. 154(b) by 292 days.

(21) Appl. No.: 14/871,470

(22) Filed: Sep. 30, 2015

(65) Prior Publication Data

US 2017/0093203 A1    Mar. 30, 2017

(51) Int. Cl.
*H02J 7/32*     (2006.01)
*A45C 15/00*    (2006.01)
*H02J 7/14*     (2006.01)
*H02K 7/18*     (2006.01)
*A45C 5/14*     (2006.01)

(52) U.S. Cl.
CPC .............. *H02J 7/1415* (2013.01); *A45C 5/14* (2013.01); *A45C 15/00* (2013.01); *H02K 7/1846* (2013.01)

(58) Field of Classification Search
CPC .................................................... H02J 7/1415
USPC ........................................................ 320/107
See application file for complete search history.

(56) References Cited

U.S. PATENT DOCUMENTS

| | | | |
|---|---|---|---|
| D395,361 S | 6/1998 | Zionts et al. | |
| 6,688,636 B2 | 2/2004 | Han | |
| 7,350,607 B2 | 4/2008 | Park et al. | |
| 7,394,165 B2 * | 7/2008 | Schiller | A45C 5/14 180/221 |
| 7,422,476 B2 * | 9/2008 | Marmaropoulos | A45C 15/00 185/15 |
| 7,511,451 B2 | 3/2009 | Pierce | |
| 8,988,038 B2 * | 3/2015 | Samuel | A45C 5/14 190/123 |
| 2010/0161116 A1 | 6/2010 | Chang | |
| 2010/0231161 A1 | 9/2010 | Brown | |
| 2012/0152677 A1 * | 6/2012 | Lu | A45C 5/14 190/18 A |
| 2012/0262117 A1 * | 10/2012 | Ferber | H02J 7/0047 320/111 |
| 2013/0032443 A1 | 2/2013 | Soedomo | |
| 2013/0221898 A1 * | 8/2013 | Frost | H02J 7/1415 320/107 |
| 2013/0257346 A1 * | 10/2013 | Jakins | H02J 7/0044 320/107 |

(Continued)

FOREIGN PATENT DOCUMENTS

WO    WO2006017704    2/2006

*Primary Examiner* — Drew A Dunn
*Assistant Examiner* — Jerry D Robbins

(57) ABSTRACT

A suitcase integrated charging and powering device integrated into a suitcase includes a suitcase that has a housing, which defines an internal space. A plurality of rollers is coupled to a bottom of the housing. A power module is positioned in the internal space and coupled to the housing. The power module comprises at least one rechargeable battery that is removable from the housing, such that the power module can be connected to an external power source and recharged. A generator is positioned in the internal space and coupled to the bottom of the housing proximate to the plurality of rollers. The generator is operationally coupled to the plurality of rollers and the power module. A plurality of ports is coupled to and positioned on the housing. The ports are operationally coupled to the power module.

8 Claims, 5 Drawing Sheets

(56) References Cited

U.S. PATENT DOCUMENTS

| | | | |
|---|---|---|---|
| 2013/0271063 A1 | 10/2013 | Wilson | |
| 2014/0274204 A1* | 9/2014 | Williams | H02J 7/0013 455/556.1 |
| 2015/0027836 A1* | 1/2015 | Zhou | A45C 9/00 190/12 A |
| 2015/0247831 A1* | 9/2015 | Lewis | G01N 33/004 455/566 |

* cited by examiner

SUITCASE INTEGRATED CHARGING AND POWERING DEVICE

BACKGROUND OF THE DISCLOSURE

Field of the Disclosure

The disclosure relates to charging and powering devices and more particularly pertains to a new charging and powering device integrated into a suitcase.

SUMMARY OF THE DISCLOSURE

An embodiment of the disclosure meets the needs presented above by generally comprising a suitcase that has a housing, which defines an internal space. A plurality of rollers is coupled to a bottom of the housing. A power module is positioned in the internal space and coupled to the housing. The power module comprises at least one rechargeable battery that is removable from the housing, such that the power module can be connected to an external power source and recharged. A generator is positioned in the internal space and coupled to the bottom of the housing proximate to the plurality of rollers. The generator is operationally coupled to the plurality of rollers and the power module. A plurality of ports is coupled to and positioned on the housing. The ports are operationally coupled to the power module.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
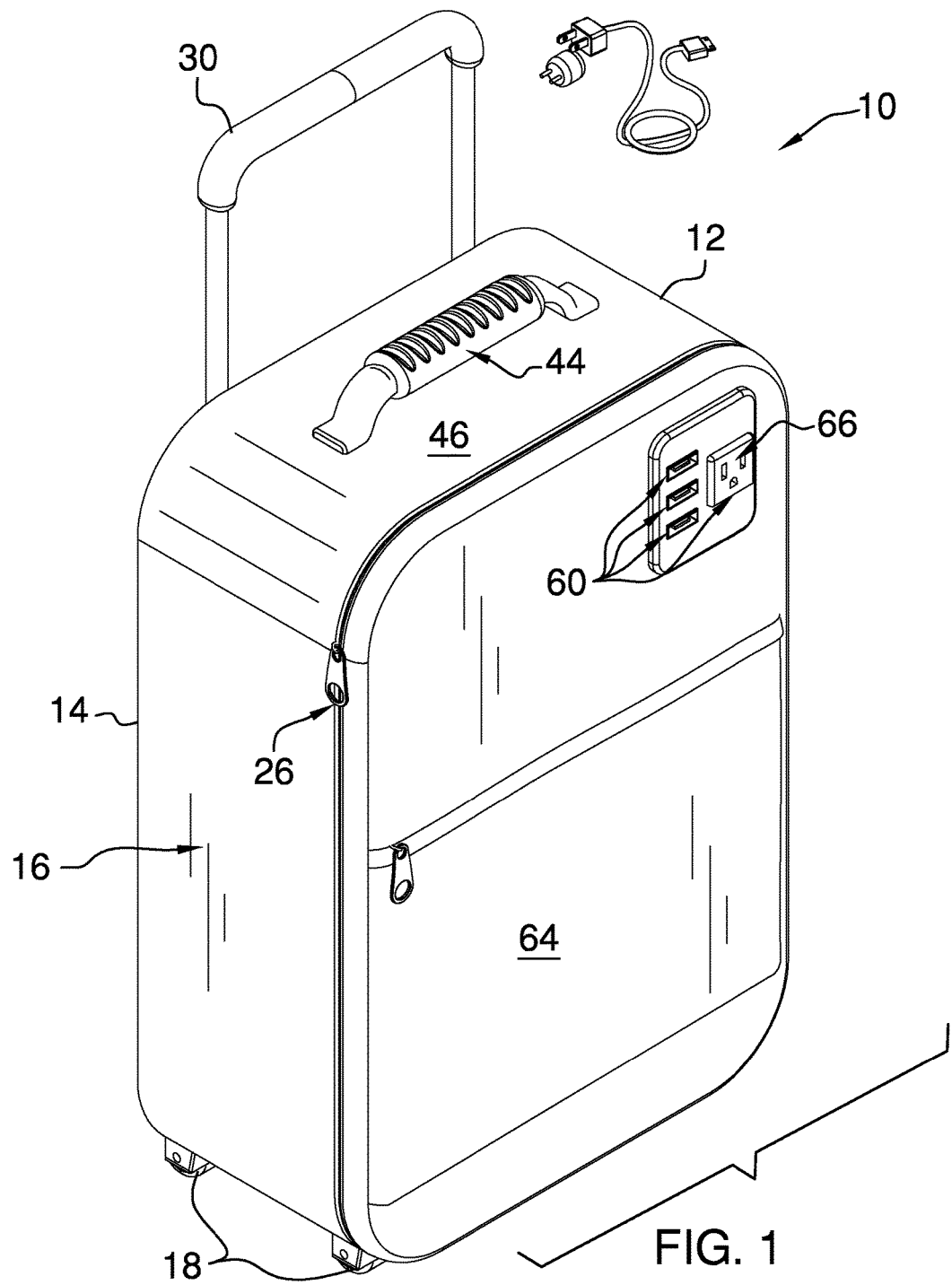
FIG. 1 is an isometric perspective view of a suitcase integrated charging and powering device according to an embodiment of the disclosure.
Figure 2:
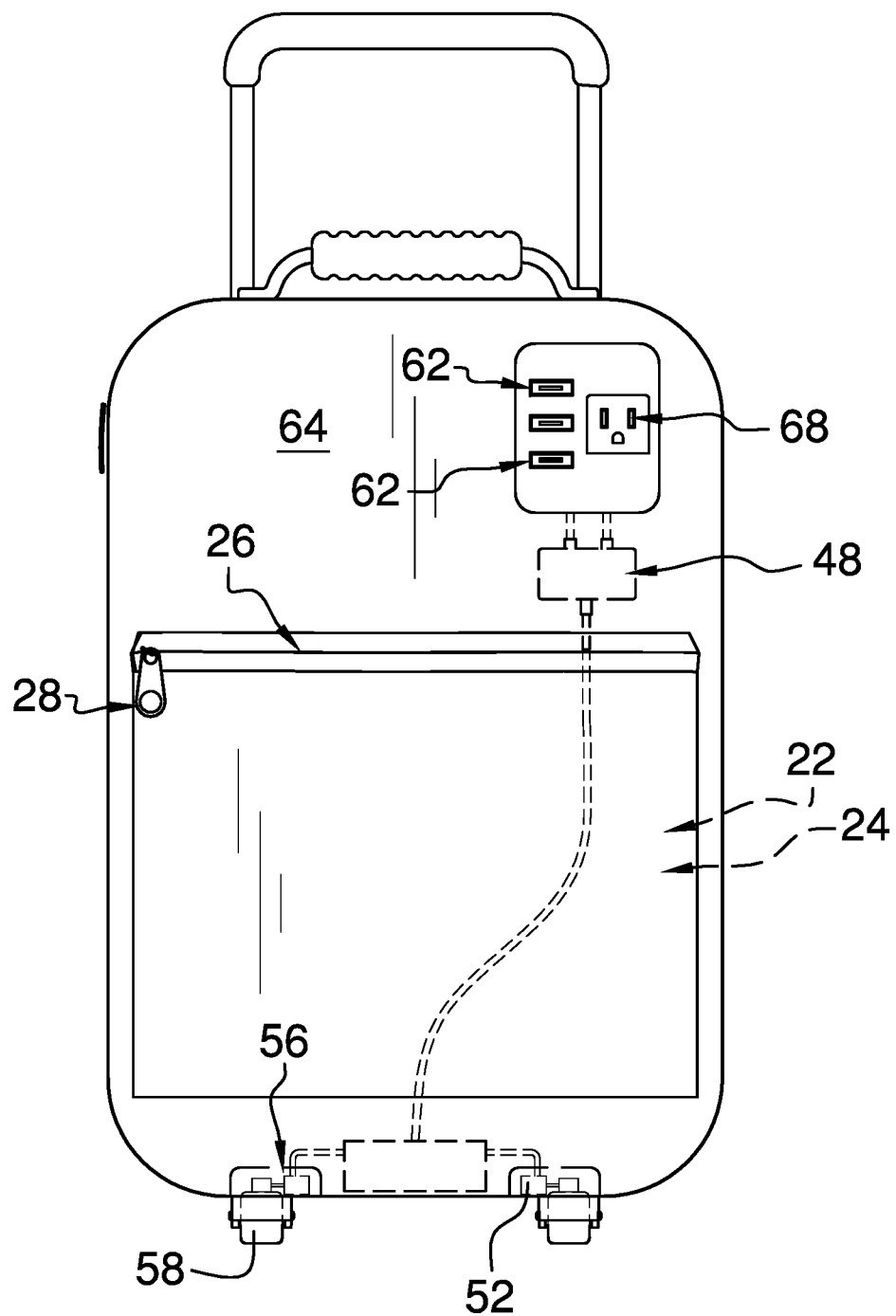
FIG. 2 is a front view of an embodiment of the disclosure.
Figure 3:
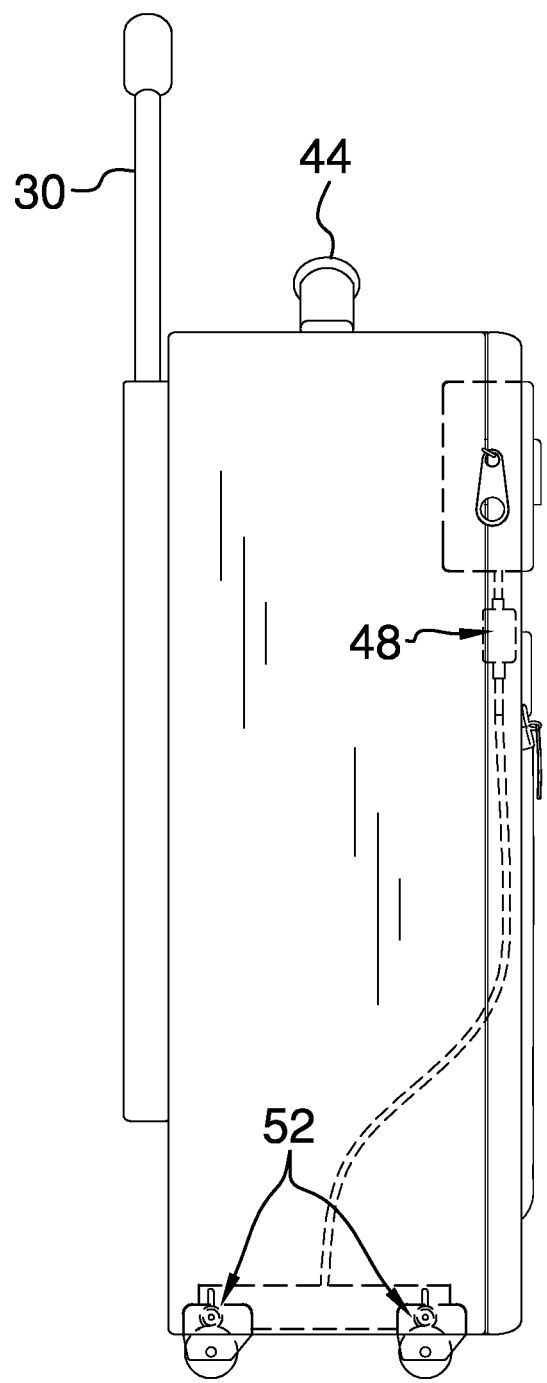
FIG. 3 is a side cut-away view of an embodiment of the disclosure.
Figure 4:
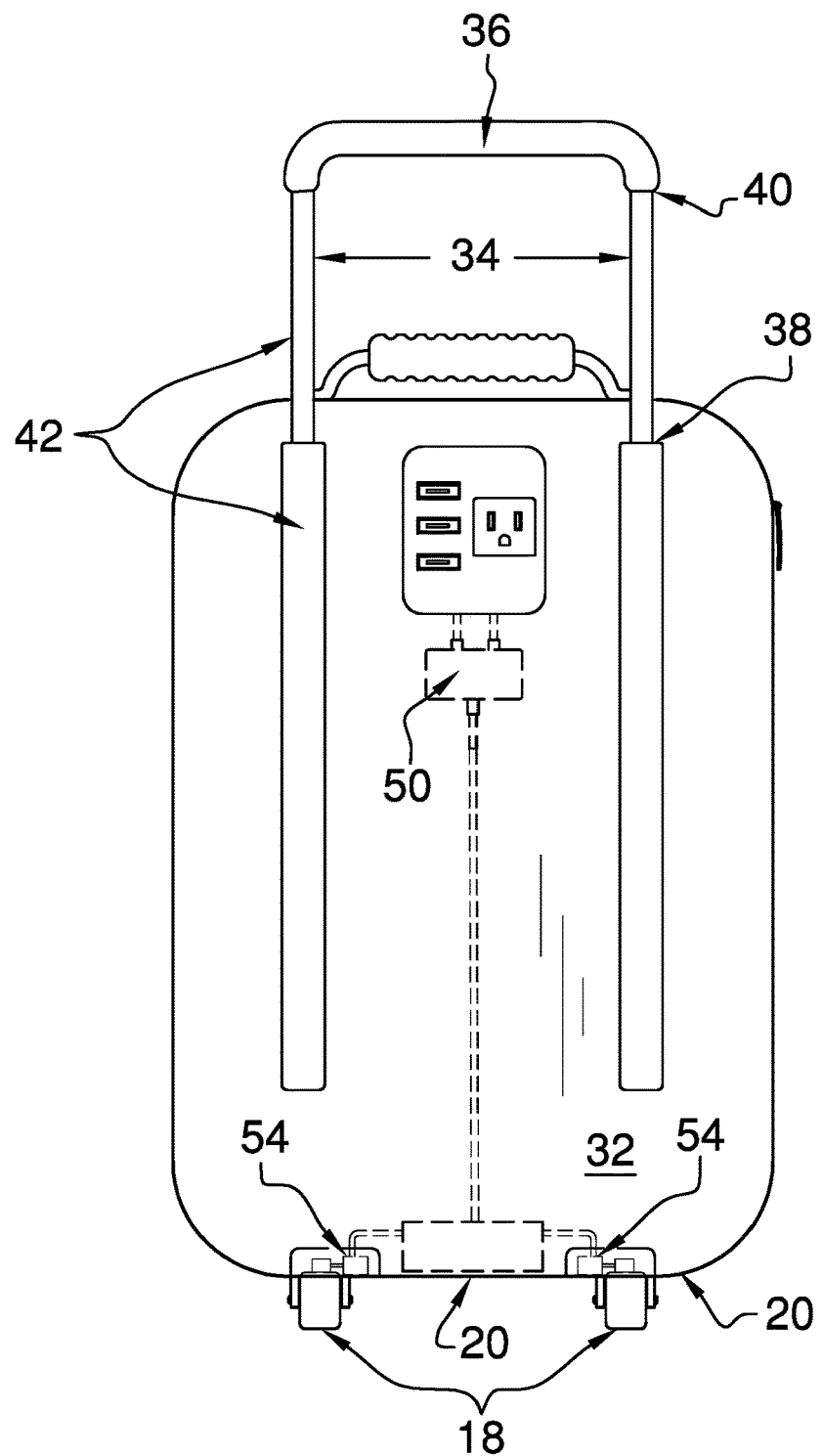
FIG. 4 is a back cut-away view of an embodiment of the disclosure.
Figure 5:
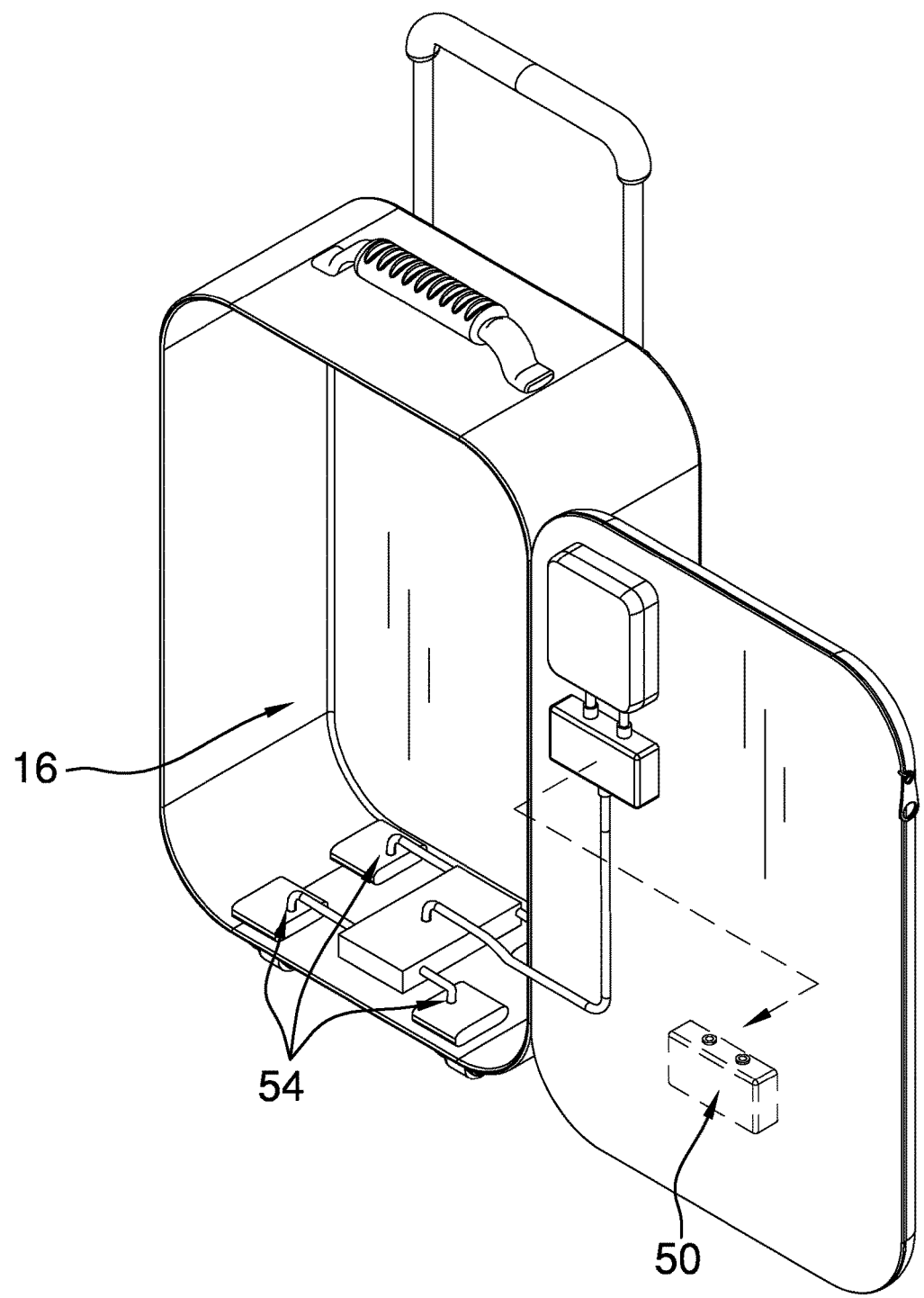
FIG. 5 is an isometric perspective view of an embodiment of the disclosure.

With reference now to the drawings, and in particular to FIGS. 1 through 5 thereof, a new charging and powering device embodying the principles and concepts of an embodiment of the disclosure and generally designated by the reference numeral 10 will be described.

As best illustrated in FIGS. 1 through 5, the suitcase integrated charging and powering device 10 generally comprises a suitcase 12 that comprises a housing 14, which defines an internal space 16. A plurality of rollers 18 is coupled to a bottom 20 of the housing 14. The plurality of rollers 18 comprises four rollers. A plurality of dividers 22 is positioned in the internal space 16 and coupled to the housing 14 defining a plurality of compartments 24 within the internal space 16. A plurality of closures 26 is coupled to the housing 14. One of each of the closures 26 is positioned proximate to a respective one of the plurality of compartments 24. The plurality of closures 26 comprises zippers 28. A handle 30 is positioned on a back 32 of the housing 14. The handle 30 comprises a pair of rods 34 and a centerpiece 36. Each of the rods 34 has a first end 38 and a second end 40. The first ends 38 are coupled to the back 32, while the second ends 40 are coupled to the centerpiece 36. Each of the pair of rods 34 comprises a plurality of nested sections 42, such that the pair of rods 34 is telescopic. A grip 44 is positioned on and coupled to a top 46 of the housing 14.

A power module 48 is positioned in the internal space 16 and coupled to the housing 14. The power module 48 comprises at least one rechargeable battery 50 that is removable from the housing 14, such that the power module 48 can be connected to an external power source and recharged. A generator 52 is positioned in the internal space 16 and coupled to the bottom 20 of the housing 14 proximate to the plurality of rollers 18. The generator 52 is operationally coupled to the plurality of rollers 18 and the power module 48. The generator 52 comprises a plurality of generators 54. Each of the plurality of generators 54 has a shaft 56 coupled to a wheel 58, and each wheel 58 is in frictional contact with a respective one of the plurality of rollers 18. The plurality of generators 54 comprises four generators.

A plurality of ports 60 is coupled to and positioned on the housing 14. The ports 60 are operationally coupled to the power module 48. The plurality of ports 60 comprises universal serial bus ports 62, preferably three universal serial bus ports. The ports 60 are positioned on a front 64 of the housing 14. Alternatively, the ports 60 are positioned on the back 32 of the housing 14.

The plurality of ports 60 may comprise a plurality of couplers 66. The couplers 66 are selected from the group of socket types consisting of socket Types A, B, C, D, E, F, G, H, I, J, K, L, M, N, and O. Preferably, the couplers 66 comprise Type B sockets 68 and the plurality of couplers 66 comprises one coupler. The device 10 also may provide for inversion of current drawn from the power module 48, such that alternating current is provided to the plurality of couplers 66.

In use, the power module 48 that is removable for charging by an external power source and also chargeable via the generator 52 that is coupled to the rollers 18, such that the user, while rolling the device 10, will generate electric current that will charge the power module 48, thus allowing the user to recharge or power electrical devices by connecting the electrical devices to the plurality of ports 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A suitcase integrated charging and powering device comprising:
    a suitcase, said suitcase comprising:
        a housing, said housing defining an internal space,
        a plurality of rollers, said plurality of rollers being coupled to a bottom of said housing,
        a plurality of dividers, said plurality of dividers being positioned in said internal space and coupled to said housing defining a plurality of compartments within said internal space,
        a plurality of closures, said plurality of closures being coupled to said housing, one of each of said closures being positioned proximate to a respective one of said plurality of compartments, said plurality of closures comprising zippers,
        a handle, said handle being positioned on a back of said housing, said handle comprising a pair of rods and a centerpiece, each of said rods having a first end and a second end, said first ends being coupled to said back, said second ends being coupled to said centerpiece, said pair of rods comprising a plurality of nested sections, such that said pair of rods is telescopic, and
        a grip, said grip being positioned on and coupled to a top of said housing;
    a power module, said power module being positioned in said internal space and coupled to said housing, said power module comprising at least one rechargeable battery, said power module being removable from said housing, such that the power module can be connected to an external power source and recharged;
    a generator, said generator being positioned in said internal space and coupled to said bottom of said housing proximate to said plurality of rollers, said generator being operationally coupled to said plurality of rollers and said power module; and
    a plurality of ports, said ports being coupled to and positioned on said housing, said ports being operationally coupled to said power module, said ports being positioned on a box coupled to a back of said housing between said rods such that each of a pair of lateral sides of said box are positioned in spaced relationship to an associated one of said rods wherein said ports are positioned on a back of said housing between said rods, said ports being symmetrically positioned about a centerline of said back of said housing and between said pair of rods of said handle.

2. The device of claim 1, further including said plurality of ports comprising universal serial bus ports.

3. The device of claim 2, further including said plurality of ports comprising three universal serial bus ports.

4. The device of claim 1, further including said plurality of ports comprising a plurality of couplers, said couplers being selected from the group of socket types consisting of socket Types A, B, C, D, E, F, G, H, I, J, K, L, M, N, and O.

5. The device of claim 4, further including said plurality of couplers comprising Type B sockets.

6. The device of claim 1, further comprising:
    said generator comprising a plurality of generators;
    each of said plurality of generators having a shaft coupled to a wheel; and
    each said wheel being in frictional contact with a respective one of said plurality of rollers.

7. The device of claim 6, further including said plurality of rollers comprising four rollers and said plurality of generators comprising four generators.

8. A suitcase integrated charging and powering device comprising:
    a suitcase, said suitcase comprising:
        a housing, said housing defining an internal space,
        a plurality of rollers, said plurality of rollers being coupled to a bottom of said housing, said plurality of rollers comprising four rollers;
        a plurality of dividers, said plurality of dividers being positioned in said internal space and coupled to said housing defining a plurality of compartments within said internal space,
        a plurality of closures, said plurality of closures being coupled to said housing, one of each of said closures being positioned proximate to a respective one of said plurality of compartments, said plurality of closures comprising zippers,
        a handle, said handle being positioned on a back of said housing, said handle comprising a pair of rods and a centerpiece, each of said rods having a first end and a second end, said first ends being coupled to said back, said second ends being coupled to said centerpiece, said pair of rods comprising a plurality of nested sections, such that said pair of rods is telescopic, and
        a grip, said grip being positioned on and coupled to a top of said housing;
    a power module, said power module being positioned in said internal space and coupled to said housing, said power module comprising at least one rechargeable battery, said power module being removable from said housing, such that the power module can be connected to an external power source and recharged;
    a generator, said generator being positioned in said internal space and coupled to said bottom of said housing proximate to said plurality of rollers, said generator being operationally coupled to said plurality of rollers and said power module, said generator comprising a plurality of generators, each of said plurality of generators having a shaft coupled to a wheel, each said wheel being in frictional contact with a respective one of said plurality of rollers, said plurality of generators comprising four generators, wherein rotation of said rollers rotates said shaft and generates electric current that flows to said power module;
    a plurality of ports, said ports being coupled to and positioned on said housing, said ports being operationally coupled to said power module, said ports comprising universal serial bus ports, said ports being positioned on a box coupled to a back of said housing between said rods such that each of a pair of lateral sides of said box are positioned in spaced relationship to an associated one of said rods wherein said ports are positioned on a back of said housing between said rods, said ports being symmetrically positioned about a centerline of said back of said housing and between said pair of rods of said handle, said plurality of ports comprising three universal serial bus ports;

said plurality of ports comprising a plurality of couplers, said couplers comprising Type B sockets; and wherein the improvement is said generator being coupled to said rollers such that the user, while rolling said device, will generate electric current that will charge said power module, said power module also being removable for charging from an external power source, allowing the user to recharge or power electrical devices by connecting the electrical devices to the plurality of ports.

* * * * *